Figure 1:
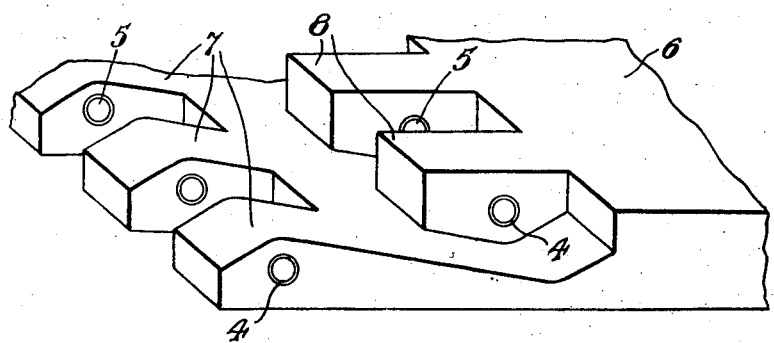

July 16, 1957  D. R. HENSON  2,799,177
BELTING
Filed Dec. 13, 1955

INVENTOR
Douglas Ronald Henson
by Benj. T. Rauber
his attorney 2,799,177
Patented July 16, 1957

2,799,177
BELTING

Douglas Ronald Henson, Erdington, Birmingham, England, assignor to Dunlop Rubber Company Limited, a British company Application December 13, 1955, Serial No. 552,908

Claims priority, application Great Britain December 21, 1954

3 Claims. (Cl. 74—231)

This invention relates to belting and more particularly to conveyor belting built from belt segments.

The object of the invention is to provide reinforced belting having a high degree of strength per unit thickness which may be built up into any desired size using standard parts.

According to the invention there is provided a segment for a conveyor belt comprising an elongated rubber or like flexible member stepped at its opposite ends and provided with a series of tongues projecting from the riser of each step, aligned apertures extending through each series of tongues, and tensile reinforcement embedded within said member and looped at each end to embrace the aperture of an associated tongue, the opposite ends of each segment being complementary whereby a plurality of segments can be fitted end to end to form a complete belt and connected securedly one to the other by couplings passing through registering apertures of interfitting tongue parts.

Preferably the tongues of each series are arranged in staggered relationship, and the tensile reinforcement is constituted by longitudinally disposed reinforcing cords, threads or the like extending between aligned tongues at opposite ends of the member.

According to a further feature of the invention there is provided a conveyor belt assembled from a plurality of belt segments as above defined, in which said segments are fitted end to end with each series of tongues of one member engaging recesses defined by an associated series of tongues of an adjacent member, the segments being connected securely one to the other by couplings passing through registering apertures of the interfitting tongue parts.

According to a still further feature of the invention there is provided a tensile reinforcement for a conveyor belt segment as hereinbefore defined, comprising a plurality of cords, yarns, threads or like tensile elements arranged in substantially parallel relationship with their opposite ends formed into series of loops of different lengths to correspond with the tongues of the flexible member.

A particular satisfactory tensile reinforcement for the belt segments comprises a woven canvas duck, wherein the longitudinal threads are arranged so as to provide at each end of the segment alternate groups of long and short loops. The duck may be woven on a conventional loom and in order to provide the loops in the weaving process the loom shuttle passes around idle warp threads at each end of the material which when removed leave the loops free. The duck is woven in lengths equivalent to the width of the belting to be produced. The warp threads are cut a short distance away from the woven section and the ends are then sewn back into the material. Alternatively other methods such as blanket stitching may be used for finishing off the edges of the warp threads. In using the duck as tensile reinforcement for the belt segments the weft thread on the loom becomes the longitudinal thread in the belt segment.

Figure 2:
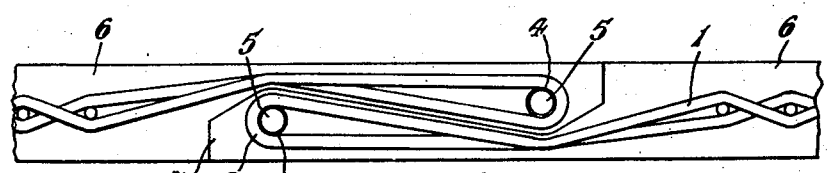
Figure 3:
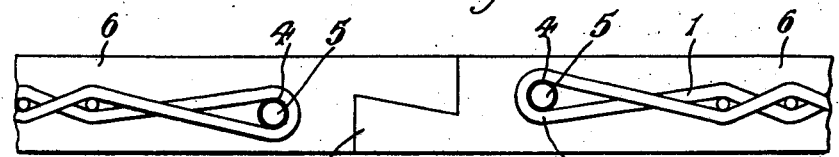
Figure 4:
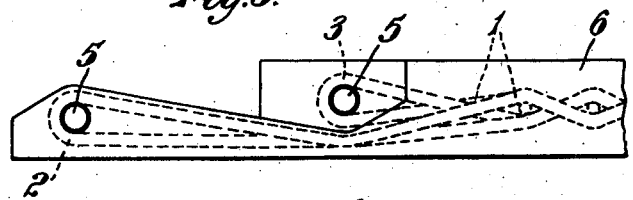

For a better understanding of the invention and to show how it may be carried into effect, the same will now be described with reference to the accompanying drawings, wherein:

Figure 1 is a diagrammatic perspective view of part of a belt segment constructed in accordance with the present invention, Figure 2 is a section showing the relative position of long loops of tensile reinforcement in adjacent belt segments, Figure 3 is a section showing the relative position of short loops of tensile reinforcement in adjacent belt segments, and Figure 4 is a sectional view of one end of a belting segment showing the relative position therein of both long and short loops.

A duck is woven from cords 1 on a conventional loom, the loops being produced by passing the loom shuttle round idle warp threads as previously described. Alternate groups of long loops 2 and short loops 3 of the weft threads are formed in this fabric. Each group of loops has a tubular sleeve 4 with outwardly flanged pe-sleeves defining channels 5 of circular cross-section. The ripheral ends fitting within the eyes of the loops, the belt covering is applied by moulding covering material 6, for example polyvinyl chloride, onto the duck. During this operation the duck is first held in the mould under a little tension by rods (not shown) passing through the registering sleeves 4 of each set of loops. The mould is then filled with polyvinyl chloride which is fused onto the duck. This mould is so designed as to give interfitting tongued end-pieces 7 and 8 and the section of belting is removed from the mould, after setting, by extracting the tensioning rods. The tapered flanged ends of the sleeves 4 prevent the moulding material running into the channels 5 during moulding and thus locking the tensioning rods therein. The sleeves are of nylon or similar material. When the belt segments of this character are interfitted and joined by means of the flexible tie rods passing respectively through the channels 5 in the groups of tongues 7 and 8 it will be appreciated that the interfitting ends fit closely together and leave no space for spillage of material carried on the conveyor belt.

It will be understood that the segments for a conveyor belt according to the invention need not necessarily be limited to two series of projecting tongued end pieces 7 and 8 through preferably the number used is a multiple of two. If desired also, the lengths of the tongues in a series may vary depending on the requirements of the belting to be formed.

As an alternative to using a woven duck as tensile reinforcement for the proposed belting, a warpless fabric may be employed providing that the weft threads terminate in groups of loops of alternating long and short length as described above. The formation of this warpless fabric may be achieved by winding weft cords round a flat strip, for example of polyvinyl chloride, so as to form a flat helix and fusing the polyvinyl chloride onto the cords by heat and pressure. As a further alternative in order to obtain the warpless type of fabric, cords or the like may be assembled in the mould by passing round tension rods located so as to provide the desired arrangement of alternate groups of long and short loops at different levels and the mould then filled with polyvinyl chloride as previously described. A still further alternative construction for the tensile reinforcement is to substitute for the longitudinal cords flat strips of high tensile plastic material such as fully orientated nylon strip.

Whilst reference has been made in the preceding paragraphs to polyvinyl chloride as the covering material for the belt segments, other materials such as rubber composition could be used equally well.

The stepped construction of belt segments in accordance with the present invention makes it possible to employ the maximum amount of tensile reinforcement whereby belting may be constructed having a high degree of strength per unit thickness. Thus the reinforcement can be designed so that the fastening ends and the body thereof are of equal strength. In many types of belting it has been hitherto necessary to weave a duck of excessive overall strength so as to obtain a required fastener strength at the ends of the belt segments. With the belt segments in accordance with the present invention the fastening ends are moulded into an interfitting shape which will give no spillage of material carried by the belt, the segments are easy to assemble, require no auxiliary equipment and have no attached hooks or loose parts other than the tie rods.

Having now described my invention what I claim is:

1. A segment for a conveyor belt comprising an elongated rubber or like flexible member stepped at its opposite ends and provided with a series of tongues projecting from the riser of each step, aligned apertures extending through each series of tongues, and tensile reinforcement embedded within said member and looped at each end to embrace the aperture of an associated tongue, the opposite ends of each segment being complementary whereby a plurality of segments can be fitted end to end to form a complete belt and connected securely one to the other by couplings passing through registering apertures of interfitting tongue parts.

2. A segment according to claim 1, wherein the tongues of each series are arranged in staggered relationship, and the tensile reinforcement is constituted by longitudinally disposed reinforcing cords threads or the like extending between aligned tongues at opposite ends of the member.

3. A segment for a conveyor belt comprising an elongated rubber or like flexible member stepped at its opposite ends and provided with a series of tongues projecting from the riser of each step, aligned apertures extending through each series of tongues, and tensile reinforcement embedded within said member and formed at each end into alternating groups of long and short loops which embrace respectively the apertures of an associated series of tongues, the opposite ends of each segment being complementary, whereby a plurality of segments can be fitted end to end to form a complete belt and connected securely one to the other by couplings passing through registering apertures of interfitting tongue parts.

References Cited in the file of this patent
UNITED STATES PATENTS

| | | |
|---|---|---|
| 856,565 | Blach | June 11, 1907 |
| 1,966,450 | Knox | July 17, 1934 |
| 2,446,311 | Traxler | Aug. 3, 1948 |
| 2,488,872 | Mathieu | Nov. 22, 1949 |
| 2,751,065 | Thomson | June 19, 1956 |
| 2,751,218 | Pass, Jr. | June 19, 1956 |